(12) United States Patent
Hofmann

(10) Patent No.: US 7,708,101 B2
(45) Date of Patent: May 4, 2010

(54) MOTOR VEHICLE SEAT HAVING OCCUPANT DETECTOR

(75) Inventor: Manfred Hofmann, Hettstadt (DE)

(73) Assignee: F.S. FEHRER Automotive GmbH, Kitzingen (DE)

( * ) Notice: Subject to any disclaimer, the term of this patent is extended or adjusted under 35 U.S.C. 154(b) by 1011 days.

(21) Appl. No.: 11/330,696

(22) Filed: Jan. 12, 2006

(65) Prior Publication Data

US 2006/0162983 A1 Jul. 27, 2006

(30) Foreign Application Priority Data

Jan. 24, 2005 (DE) ................ 20 2005 001 164 0 U
Nov. 28, 2005 (DE) ...................... 10 2005 056 882

(51) Int. Cl.
- *B60K 28/00* (2006.01)
- *A47C 7/62* (2006.01)
- *H01H 35/00* (2006.01)

(52) U.S. Cl. ............... 180/273; 297/217.2; 200/85 A; 701/45

(58) Field of Classification Search ........... 180/273; 280/735; 297/217.1, 217.2, 217.3; 200/85 A; 701/45

See application file for complete search history.

(56) References Cited

U.S. PATENT DOCUMENTS

| | | | |
|---|---|---|---|
| 4,864,084 A * | 9/1989 | Cardinale | .................. 200/5 A |
| 5,570,903 A | 11/1996 | Meister et al. | |
| 5,986,221 A * | 11/1999 | Stanley | .................. 177/136 |
| 5,991,676 A * | 11/1999 | Podoloff et al. | ................ 701/45 |
| 6,371,552 B1 * | 4/2002 | Narita et al. | ............ 297/180.12 |
| 6,392,178 B1 * | 5/2002 | Kuratani | .................... 200/512 |
| 6,429,668 B1 * | 8/2002 | Billen et al. | ................ 324/699 |
| 6,448,789 B1 | 9/2002 | Kraetzl et al. | |
| 6,483,055 B1 * | 11/2002 | Tanabe et al. | .............. 200/85 A |
| 6,877,808 B2 * | 4/2005 | Lichtinger et al. | ........ 297/217.3 |
| 6,953,224 B2 * | 10/2005 | Seto et al. | ................. 297/217.3 |
| 6,977,592 B2 * | 12/2005 | Orlewski | ..................... 340/667 |
| 7,119,705 B2 * | 10/2006 | Manlove et al. | .............. 340/667 |
| 7,176,390 B2 * | 2/2007 | Hansen et al. | ............... 177/136 |
| 7,337,681 B2 * | 3/2008 | Nikaido et al. | .......... 73/862.541 |
| 2002/0001694 A1 | 1/2002 | Wetzel | |
| 2003/0141983 A1 * | 7/2003 | Schmiz et al. | ............... 340/687 |
| 2004/0012499 A1 | 1/2004 | Giesel et al. | |

FOREIGN PATENT DOCUMENTS

| | | |
|---|---|---|
| DE | 44 06 897 C1 | 5/1995 |
| DE | 196 01 969 A1 | 7/1997 |
| DE | 197 52 976 A1 | 6/1998 |
| DE | 19956545 C1 | 4/2001 |
| DE | 100 38 830 A1 | 12/2001 |
| DE | 101 18 629 A1 | 10/2002 |
| DE | 102 15 390 A1 | 10/2003 |
| DE | 102 49 871 A1 | 5/2004 |
| EP | 0 891 898 A1 | 1/1999 |
| EP | 1249362 | 10/2002 |

(Continued)

*Primary Examiner*—Toan C To
(74) *Attorney, Agent, or Firm*—McGlew and Tuttle, P.C.

(57) ABSTRACT

A seat for a motor vehicle is provided with an occupant detector (02) for recognizing the occupancy status of the seat (01). A foamed cushion element (05), into which the occupant detector (02) is foamed, is provided as part of the seat.

20 Claims, 3 Drawing Sheets

FOREIGN PATENT DOCUMENTS

| | | |
|---|---|---|
| EP | 1 283 005 B1 | 2/2003 |
| EP | 1 342 627 A2 | 9/2003 |
| EP | 1 533 193 A1 | 5/2005 |
| JP | 9226428 | 9/1997 |
| JP | 10211836 | 8/1998 |
| WO | WO 01/14171 A1 | 3/2001 |
| WO | WO 01/86676 A1 | 11/2001 |

* cited by examiner

MOTOR VEHICLE SEAT HAVING OCCUPANT DETECTOR

CROSS REFERENCE TO RELATED APPLICATIONS

This application claims the benefit of priority under 35 U.S.C. §119 of German Patent Application DE 20 2005 001 164.9 filed Jan. 24, 2005 and German Patent Application DE 10 2005 056 882.3 filed Nov. 28, 2005, the entire contents of which are incorporated herein by reference.

FIELD OF THE INVENTION

The present invention relates to a seat for a motor vehicle having an occupant detector for recognizing the occupancy status of the seat.

BACKGROUND OF THE INVENTION

Seats of the generic type have an occupant detector which may be included, for example, in a signaling device for unbelted occupants located on the seat. Furthermore, incorporating the occupant detector in the triggering controller of an airbag is conceivable.

Until now, such an occupant detector has been implemented, for example, by a plastic film having capacitive sensors located between the covering and cushion element of the seat. However, this solution has significant disadvantages. Occupant detectors of this type are complex and costly to manufacture, difficult to position and not permanently fixed, have a poor influence on the seat climate and the seat comfort and obstruct the integration of additional seat elements such as a seat heater.

A further possibility for implementing an occupant detector is installing a scale in the seat frame, which, however, requires costly and complex electronics and is also costly and complex to manufacture.

SUMMARY OF THE INVENTION

The object of the present invention is to provide a novel seat for a motor vehicle having an occupant detector.

According to the present invention, the at least one foamed cushion element is provided on the seat for a motor vehicle having an occupant detector for recognizing the occupancy status of the seat. The occupant detector is foamed into the cushion element. In this case, the construction of a motor vehicle seat is basically arbitrary. However, a motor vehicle seat frequently comprises multiple sections and usually has a seat part and a backrest. The core of the different sections is frequently formed in each case by a cushion element. The construction of a cushion element is also basically arbitrary. Such a cushion element is frequently foamed from a foam material.

The motor vehicle seat has an occupant detector for recognizing the occupancy status of the seat. Information may thus be provided to an electronic system, for example, as to whether this seat is occupied by an occupant. This occupant detector is foamed into the cushion element according to the present invention, and not laid on the cushion element as until now. If there are multiple cushion elements, the cushion element into which the occupant detector is foamed is basically arbitrary. However, foaming the occupant detector into the cushion element of the seat part of the motor vehicle seat is especially advantageous. Reliable detection of the occupancy status of the seat may thus be achieved.

Because the occupant detector is foamed into the cushion element, there is no obstruction of the integration of further seat components, such as a seat heater. Furthermore, the installation of the occupant detector is significantly simplified, since in particular complex positioning of the occupant detector is dispensed with. The occupant detector may be foamed into the cushion element during the manufacturing process thereof. The positioning of the occupant detector is thus predefined by the foam mold. Furthermore, displacement of the occupant detector during the operation of the motor vehicle seat is made significantly more difficult compared to the solutions hitherto known. In addition, the occupant detector in the motor vehicle seat according to the present invention is protected from functional impairments and/or damage due to external influences by the foam surrounding it.

Basically, the side on which the occupant detector is foamed into the cushion element is arbitrary. However, in an especially advantageous embodiment, the occupant detector is foamed into the cushion element on the side facing away from the occupant. Through this arrangement, the integration of further seat components is not obstructed. Furthermore, this arrangement has a favorable effect on the seat climate and the seat comfort due to the spatial distance to the occupant. For due to the spatial distance of the occupant detector to the occupant, the ventilation, breathing activity, and softness of the seat are positively influenced. Furthermore, foaming in the occupant detector on the side of the cushion element facing away from the occupant offers further protection against functionally interfering and/or damaging influences.

In a further advantageous embodiment, the occupant detector is essentially foamed into the cushion element opposite the posterior of the occupant on the side facing away from the occupant. This arrangement offers special advantages for occupant detectors which exploit the weight of the seated occupant. The largest component of the weight exerted by the occupant is transmitted via his posterior to the motor vehicle seat. Through the arrangement of the occupant detector essentially opposite the posterior of the occupant, the occupant detector experiences the largest possible component of the weight of the occupant. In this case, the weight acts indirectly through the cushion element on the occupant detector.

The construction of the occupant detector is basically unimportant. In an especially simple embodiment, the occupant detector has at least two electrically conductive contact elements which may be contacted. The selection of the contact elements is also basically unimportant. By changing the contact status of the contact elements, i.e., either their contacting or their decontacting, an electrical control signal may be generated. This control signal may then be relayed to analysis electronics.

Furthermore, the contact elements may also be spaced apart by at least one elastically deformable spacing element. The spacing element obstructs contacting of the contact elements, the contacting being a function of the strength of the force acting on the contact elements. This force is at least indirectly subjected to the effect of the weight of the occupant located on the seat.

Without a force acting on the contact elements, these elements are held separate from one another in their starting position by the spacing element. Through the effect of a force on at least one of the contact elements, particularly a weight of an occupant located on the seat, the elastically deformable spacing element is contracted until the contact elements come into contact at a specific force. After the effect of force on the contact elements, the spacing element relaxes again and spaces apart the contact elements into their original position. The force at which contact occurs between the contact elements may be varied in specific limits by the elasticity of the spacing element. The composition of the spacing element is arbitrary in principle. The spacing element may also basically be formed by a spring element or by a foam element.

This type of an occupant detector is distinguished by an especially simple construction, few components, inexpensive components, simple manufacturing, and its freedom from wear. Therefore, it is especially suitable for the foaming into the cushion element according to the present invention.

In a further embodiment, the spacing element has an electrically insulating effect. This offers the special advantage that no additional means must be provided for insulating the two contact elements.

For example, the spacing element may be formed by an electrically insulating foam element. This is both elastically deformable and electrically insulating.

The precise composition and implementation of this spacing element is arbitrary in principle. In an especially advantageous embodiment, however, this spacing element implemented as a foam element is implemented like a foam layer provided with recesses. In this case this foam layer is to be located precisely between the two contact elements. Together, this component may be constructed like a three-layered sandwich component, the two outer layers being formed by the contact elements and the inner layer being formed by the foam layer provided with recesses. The response sensitivity, specifically the contacting of the contact elements in the event of a specific force acting on at least one of the contact elements, may be varied by the size of the recesses within certain limits, in addition to the elasticity of the spacing element.

The contact between the two contact elements may basically be produced in any arbitrary way. In an especially advantageous embodiment, the contact is produced within the recesses through the foam layer.

Furthermore, it is advantageous if the contact elements have an electrically conductive metal, particularly if the contact elements are implemented in the form of oblong metal plates. The contact elements may then enclose the spacing element in a particularly simple manner.

The arrangement of the contact elements in relation to one another is basically arbitrary. However, positioning the contact elements essentially parallel to one another is especially advantageous. The manufacturing of the occupant detector is thus significantly simplified.

The occupant detector may be manufactured in a sandwich construction

In a further advantageous embodiment, at least one hump-shaped protrusion is provided on at least one of the contact elements, the contact between the two contact elements occurring at the hump-shaped protrusion.

The embodiment of this hump-shaped protrusion is basically arbitrary. For example, it may be added by shaping the contact element, particularly in the course of post processing, or may be added later to the contact element in the form of an additional protrusion element.

The distance between the two contact elements in the area of the hump-shaped protrusion is reduced by the hump-shaped protrusion on at least one contact element. In a further advantageous embodiment, the recesses of the foam layer of the spacing element are positioned in such a way that the hump-shaped protrusion may penetrate through the recess. Secure contacting of the contact elements thus occurs. The hump-shaped protrusion overcomes the minimum distance between the contact elements, which is predefined by the contracted spacing element.

In a further embodiment, the occupant detector thus formed may be welded into a plastic film. The foaming procedure in the cushion element is thus simplified further. Furthermore, the occupant detector is protected once again from external influences.

The use of the occupant detector is basically arbitrary. In a further embodiment, the occupant detector is connected indirectly or directly to a signaling device, particularly for the acoustic and/or visual signaling of unbelted persons located on the seat. Therefore, through a linked analysis of the signal from the occupant detector and the safety belt of the relevant seat, a conclusion on the security of the respective occupant may be drawn. The signal of the occupant detector avoids triggering of the signal when the seat is not occupied, for example.

In a further embodiment, the occupant detector is connected indirectly or directly to the controller of an air bag. In this case, for example, the unfolding of the air bag in front of the relevant seat may be forced or avoided in connection with other traffic signals. In addition, the unfolding of the air bag and subsequent replacement of the air bag may be avoided if the seat is not occupied.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
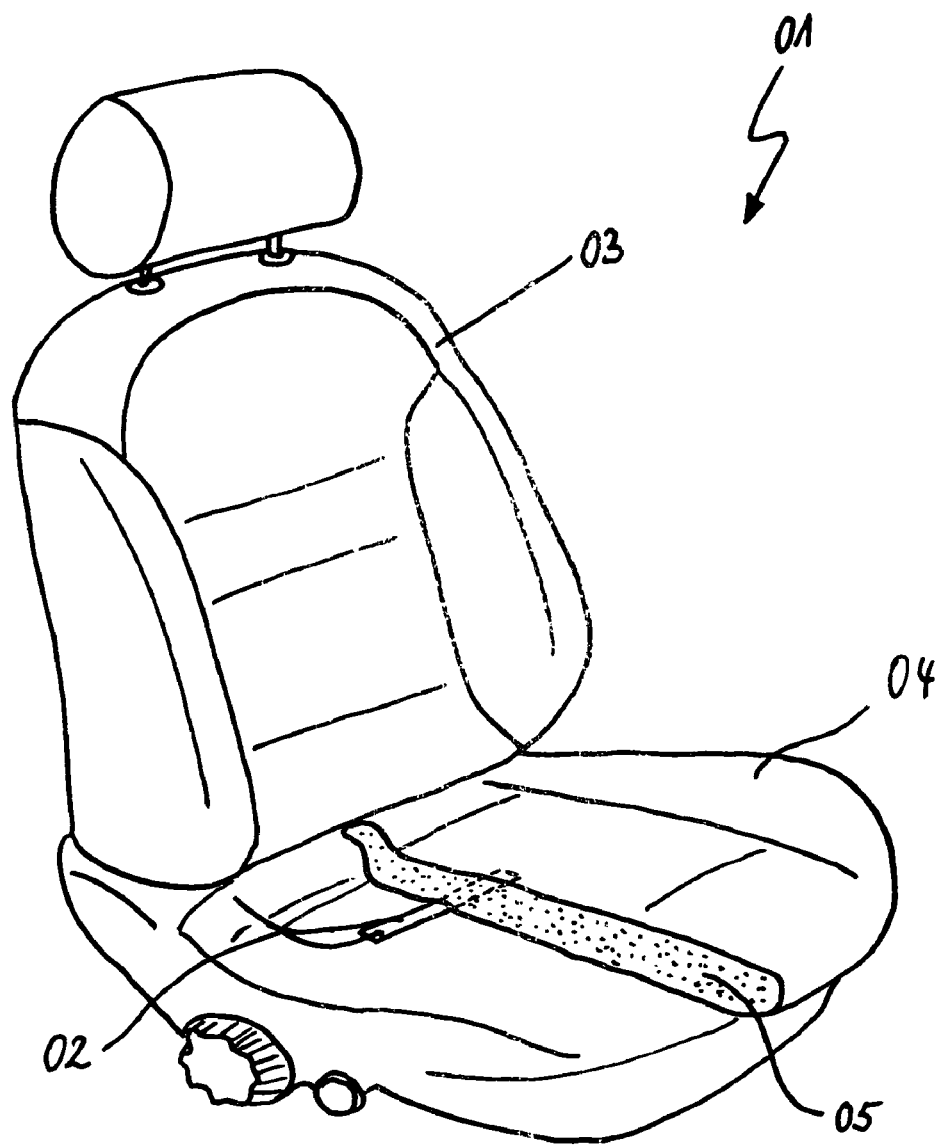
FIG. 1 is a perspective view showing the motor vehicle seat having an occupant detector according to the present invention.

Referring to the drawings in particular, FIG. 1 shows an embodiment of the motor vehicle seat 01 having an occupant detector 02. The motor vehicle seat 01 has a backrest 03 and a seat part 04. Furthermore, the motor vehicle seat 01 has a cushion element 05, which forms the core of the seat part 04. The occupant detector 02 is foamed into the cushion element 05 on the side of the cushion element 05 facing away from the occupant. Furthermore, the occupant detector 02 is located in the area of the posterior of an occupant located on the motor vehicle seat 01.

Figure 2:
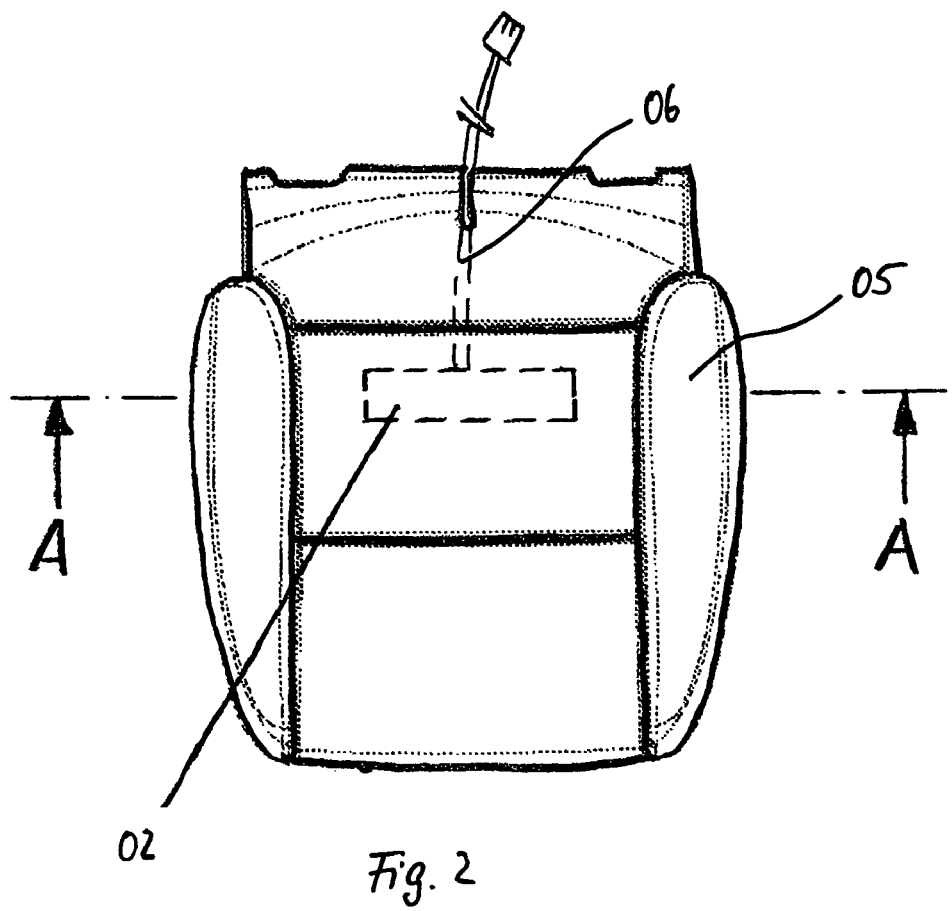
FIG. 2 is a schematic view from above showing a cushion element of the seat part of the motor vehicle seat according to FIG. 1.

FIG. 2 shows the positioning of the occupant detector 02 in the cushion element 05 in the area of the posterior of an occupant located on the motor vehicle seat 01. Furthermore, the cushion element 05 is connected to a transmission line 06 for transmitting the signal of the occupant detector 02 to a control unit.

Figure 3:
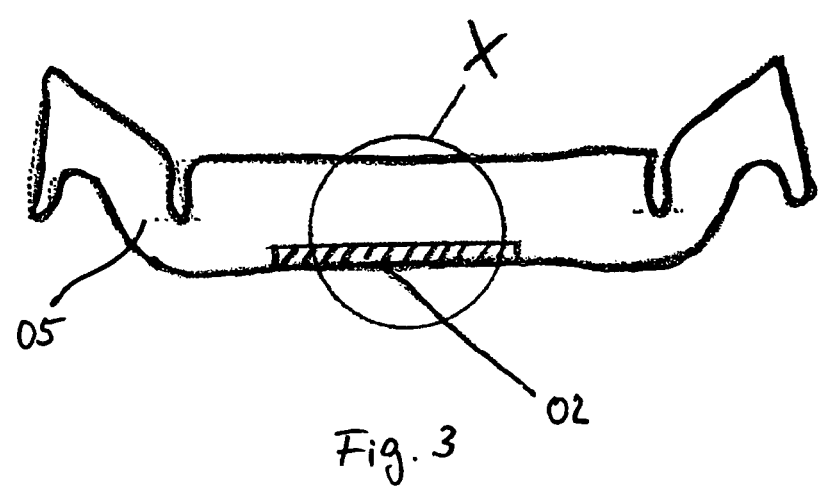
FIG. 3 is a cross-sectional view taken along the section line A-A showing the cushion element according to FIG. 2.

FIG. 3 shows the positioning of the occupant detector 02 on the side of the cushion element 05 facing away from the occupant. The occupant detector 02 is foamed into the cushion element 05 and terminates essentially flat with the cushion element 05 on the bottom thereof. In this embodiment, no outer edges result in the area of the foamed-in occupant detector 02.

Figure 4:
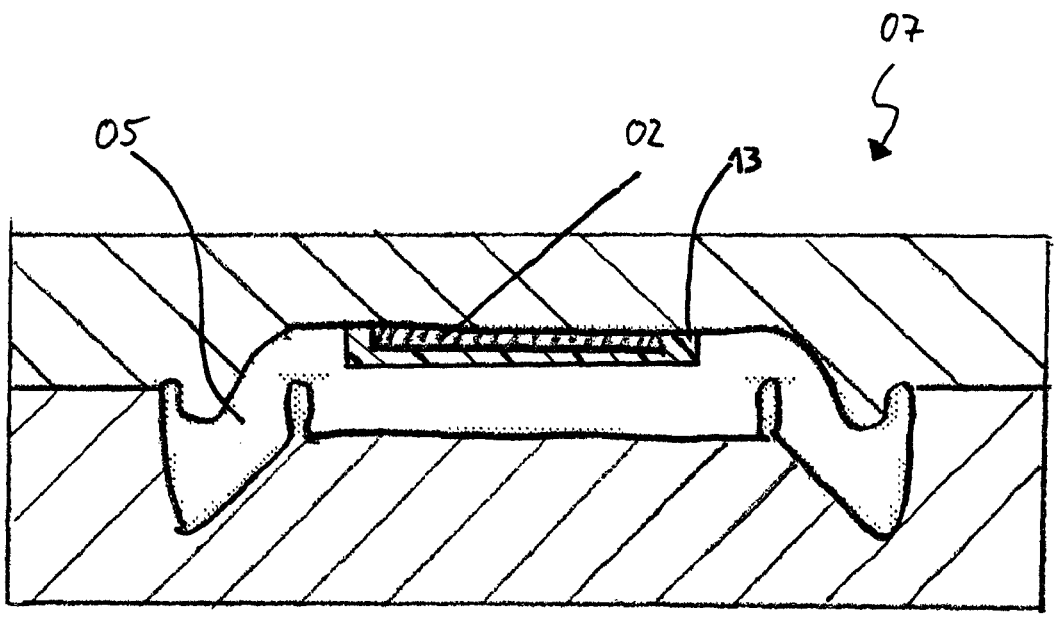
FIG. 4 is a cross-sectional view showing a foam mold for manufacturing the cushion element according to FIGS. 2 and 3.

FIG. 4 shows a foam mold 07 for manufacturing a cushion element 05. The cushion element 05 is located rotated by 180° here in the foam mold 07. The side of the cushion element 05 facing away from the occupant is thus the top side of the cushion element 05 here. The occupant detector 02 is located on this side. The occupant detector may be welded into a plastic film 13. In this embodiment, it has been foamed into the cushion element 05 already during the foaming procedure in the foam mold 07.

Figure 5:
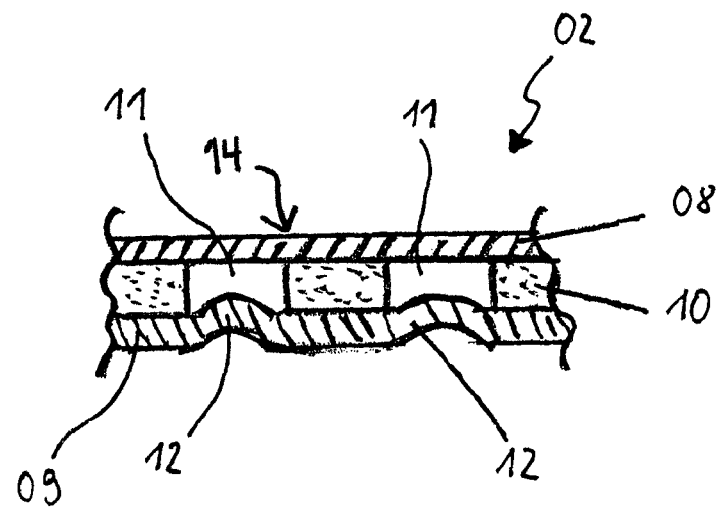
FIG. 5 is a cross-sectional view taken along the section line A-A in area X showing the occupant detector in the cushion element according to FIGS. 2 and 3.

FIG. 5 shows an occupant detector 02 in cross-section in the area X. The occupant detector 02 has a first conductive contact element 08 and a second conductive contact element 09. The first conductive contact element 08 and the second conductive contact element 09 may be an oblong metal plate 14. The spacing element 10 is implemented as an electrically insulating foam layer 10 here. The spacing element 10 is located between the two contact elements 08, 09, which are positioned essentially parallel to one another.

The foam layer 10 has recesses 11. The second contact element 09 is provided with hump-shaped protrusions 12 in the area of the recesses 11. The foam layer 10 is compressed through pressure on at least one of the two contact elements 08, 09 and at a specific force, there is contact of the contact elements 08, 09 through the recesses 11 via the hump-shaped protrusions 12.

While specific embodiments of the invention have been shown and described in detail to illustrate the application of the principles of the invention, it will be understood that the invention may be embodied otherwise without departing from such principles.

What is claimed is:

1. A seat for a motor vehicle, the seat comprising:
   an occupant detector for recognizing an occupancy status of the seat; and
   a foamed cushion element comprising a foam layer, said foam layer includes a plurality of elastically deformable spacing elements, each elastically deformable spacing elements defining a plurality of recesses, the occupant detector being foamed into the cushion element, said occupant detector having at least two electrically conductive contact elements, one of said electrically conductive contact elements being located at a spaced location from another of said electrically conductive contact elements via one or more of said elastically deformable spacing elements, each of said elastically deformable spacing elements engaging each of said electrically conductive contact elements, each of said elastically deformable spacing elements being an electrically insulated foam element.

2. The seat for a motor vehicle according to claim 1, wherein the occupant detector is foamed into the foamed cushion element on a side facing away from the occupant.

3. The seat for a motor vehicle according to claim 1, wherein the occupant detector is foamed into the foamed cushion element essentially opposite the posterior of the occupant on a side facing away from the occupant.

4. The seat for a motor vehicle according to claim 1, wherein said elastically deformable spacing element electrically insulates said one of said electrically conductive contact elements from said another of said electrically conductive contact elements.

5. The seat for a motor vehicle according to claim 1, wherein said electrically conductive contact elements comprise an electrically conductive metal.

6. The seat for a motor vehicle according to claim 1, wherein said electrically conductive contact elements are implemented in the form of oblong metal plates.

7. The seat for a motor vehicle according to claim 1, wherein said electrically conductive contact elements are positioned essentially parallel to one another.

8. The seat for a motor vehicle according to claim 1, wherein at least one hump-shaped protrusion is provided on at least one of said electrically conductive contact elements, wherein contact between said two contact elements occurs at said hump-shaped protrusion, said hump-shaped protrusion extending into one of said recesses of said foam layer.

9. The seat for a motor vehicle according to one of claim 1, wherein said occupant detector is welded into a plastic film.

10. The seat for a motor vehicle according to claim 1, wherein said occupant detector is connected indirectly or directly to a signaling device, particularly for the acoustic and/or visual signaling of unbelted persons located on the seat.

11. The seat for a motor vehicle according to claim 1, wherein said occupant detector is connected indirectly or directly to an controller of an airbag.

12. A seat for a motor vehicle, the seat comprising:
    a seat part with a foamed cushion element;
    a plurality of elastically deformable spacing elements, each elastically deformable spacing element and another elastically deformable element defining a recess; and
    an occupant detector for recognizing the occupancy status of the seat, the occupant detector being incorporated into the cushion element by being foamed therein during formation of said foamed cushion element, said occupant detector including a first electrically conductive contact element and a second electrically conductive contact element, said second electrically conductive contact element having one or more projecting portions extending into one or more of said recesses, each of said elastically deformable spacing elements engaging said first electrically conductive contact element and said second electrically conductive contact element, said occupant detector being mounted for movement such that said first electrically conductive contact element is movable from a first position to a second position, said first electrically conductive contact element being located at a spaced location from said second electrically conductive contact element via at least one of said elastically deformable spacing elements when said first electrically conductive contact element is in said first position, at least one of said projecting portions engaging said first electrically conductive contact element in at least one of said recesses when said first electrically conductive contact element is in said second position.

13. The seat for a motor vehicle according to claim 12, wherein at least one of said elastically deformable spacing elements is in a non-compressed state when said first electrically conductive contact element is in said first position.

14. The seat for a motor vehicle according to claim 12, wherein at least one of said elastically deformable spacing elements is in a compressed state when said first electrically conductive element is in said second position.

15. The seat for a motor vehicle according to claim 14, wherein each of said elastically deformable spacing elements is an electrically insulating foam element.

16. The seat for a motor vehicle according to claim 15, wherein said first electrically conductive contact element is located opposite said second electrically conductive contact element.

17. The seat for a motor vehicle according to claim 16, wherein said first electrically conductive contact element is substantially equal to a length of said second electrically conductive contact element.

18. A seat for a motor vehicle, the seat being formed by the steps comprising:

providing an occupant detector for recognizing the occupancy status of the seat, said occupant detector comprising a first elastically deformable spacing element, a second elastically deformable spacing element, a first electrically conductive contact element and a second electrically conductive contact element, said first elastically deformable spacing element and said second elastically deformable spacing element defining a first space, said second electrically conductive contact element having a first projecting portion, said first projecting portion extending into said first recess, said first electrically conductive element being mounted for movement such that said first electrically conductive element moves from a non-contact position to a contact position, said second first projecting portion being in contact with said first electrically conductive element in said first recess when said first electrically conductive element is in said second position, said first electrically conductive element being located at a spaced location from said second electrically conductive element via one or more of said first elastically deformable spacing element and said second elastically deformable spacing element;

placing the occupant detector in a seat region; and forming a cushion element foaming in the occupant detector with foam material as the occupant detector is positioned in the seat region such that the occupant detector is incorporated into a cushion element by being foamed therein during formation of said foamed cushion element.

19. The seat for a motor vehicle according to claim 18, wherein said first elastically deformable spacing element and said second elastically deformable spacing element are electrically insulating foam elements.

20. The seat for a motor vehicle according to claim 19, wherein said occupant detector includes a third elastically deformable spacing element, said second elastically deformable spacing element and said third elastically deformable spacing element defining a second recess, said second electrically conductive contact element having a second projecting portion, said second projecting portion extending into said second recess, said second projecting portion engaging said first electrically conductive contact element in said second recess when said first electrically conductive contact element is in said second position, one or more of said first elastically deformable spacing element, said second elastically deformable spacing element and said third elastically deformable spacing element is in a compressed state when said first electrically conductive contact element is in said second position, said first elastically deformable spacing element, said second elastically deformable spacing element and said third elastically deformable spacing element engaging said first electrically conductive contact element and said second electrically conductive contact element.

* * * * *